C. Yost.
Harvester Rake.
№ 18221                    Patented Sep. 15, 1857.
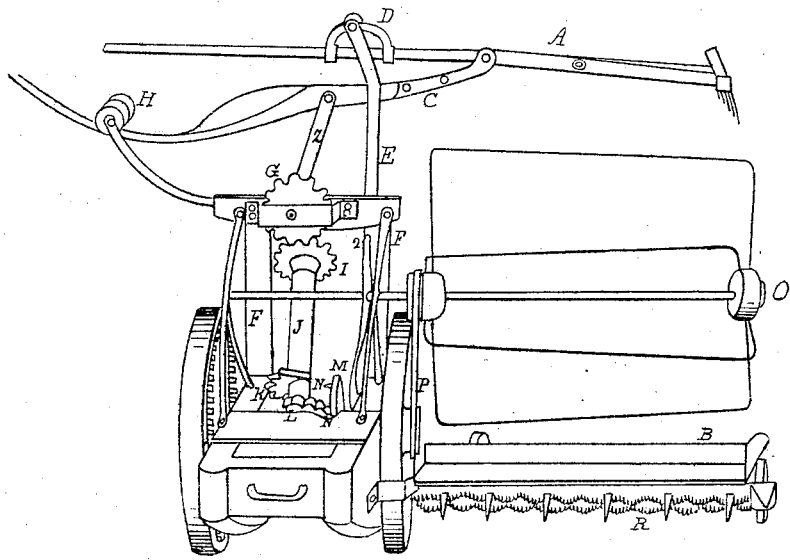
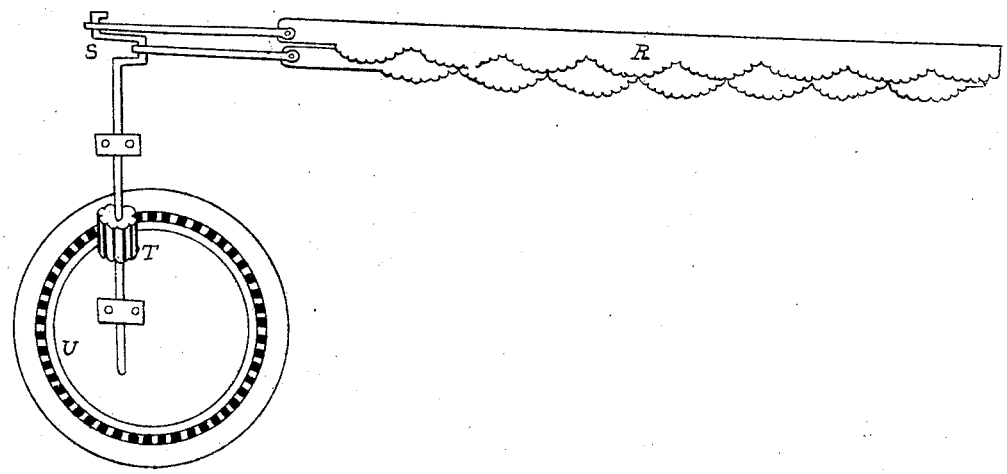

UNITED STATES PATENT OFFICE.

CHRISTIAN YOST, OF LEACOCK TOWNSHIP, LANCASTER COUNTY, PA.

IMPROVED RAKING ATTACHMENT FOR REAPING-MACHINES.

Specification forming part of Letters Patent No. 18,221, dated September 15, 1857.

*To all whom it may concern:*

Be it known that I, CHRISTIAN YOST, of Leacock township, Lancaster county, State of Pennsylvania, have invented new and useful Improvements in Rakers for Reaping; and I do hereby declare that the following is a full and exact description thereof, reference being had to the accompanying drawings, and to the letters of reference marked thereon, making a part of this specification.

The nature of my invention is giving the rake a downward and quick motion as it reaches the platform by means of mechanism constructed and arranged in a peculiar manner.

To enable others skilled in the art to make and use my invention, I will proceed to describe its construction and operation.

A is the rake, which has a quick downward motion, for clearing the platform, and the regulator C holds the rake up and again brings it across the platform.

D is a semicircular device, made of iron, and which is suspended to an upright iron support, E, attached to frame F. This device D has a pendulum motion and supports the handle of the rake A.

G is a cog-wheel attached to upper part of frame F, which gives motion to the regulator C, and the handle of the regulalor C operates on the under side of a pulley, H.

I is a bevel-wheel, which gears into the wheel G, and is attached to one end of a vertical shaft, J. At the other end of shaft J are two semi cog-wheels, K and L—the one above the other. The upper cogs, K, give the quick motion to the rake A as it touches the platform B.

M is a vertical plate-wheel, located near the center of the carriage-wheel axle, and has two pins or cogs, N N, on the inside of the wheel. One operates on the lower semi cog-wheel, L, and the other pin N operates on the upper half cog-wheel, K, by the revolution of the carriage-wheel axle.

The reel O receives its motion from the carriage-axle by the strap P, surrounding the hub of carriage-axle. The lever 2 operates upon the platform B to make the platform, with the knives R, pass easily over uneven ground by raising or lowering. The knives R are operated by a double crank, S, driven by a pinion, T, geared into the teeth U on the inside of one of the carriage-wheels.

What I claim as my invention, and desire to secure by Letters Patent, is—

Operating the rake A by means of the device D, the regulator C, in combination with the semi cog-wheels K L and pins N N, arranged and connected substantially as herein set forth.

CHRISTIAN YOST.

Witnesses:
I. FRANKLIN REIGART,
M. CARPENTER.